UNITED STATES PATENT OFFICE.

GEORG PFLEIDERER, OF GROSS-LICHTERFELDE, NEAR BERLIN, GERMANY.

ELECTRIC BATTERY.

1,011,485.

Specification of Letters Patent.

Patented Dec. 12, 1911.

No Drawing.

Application filed June 21, 1911. Serial No. 634,457.

*To all whom it may concern:*

Be it known that I, GEORG PFLEIDERER, chemist, a citizen of the German Empire, residing at Gross - Lichterfelde, near Berlin, Germany, have invented certain new and useful Improvements in or Relating to Electric Batteries, of which the following is a specification.

This invention relates to an improvement in that class of so-called dry batteries which has a dry electrolyte, which upon addition of water assumes a gelatinous consistency and operates as a "dry-battery".

It is advantageous to be able to fill the battery container with dry friable material, but such material obviously will not maintain itself within the container, unless some means such as a blotting-paper pad is used to keep it in place. The use of such a pad is objectionable as the absorption of the water through this pad is slow. If the dry electrolyte material has added to it, prior to filling the receptacle, some material which makes it sticky enough to stay in place, the mass is difficult to handle when filling the receptacle.

These difficulties I obviate by my invention which consists in adding to the dry electrolytic mass an additional dry ingredient of such character that, after the mixture has been filled into the battery receptacle, the mixture will become sticky, and adhere to the container. Suitable materials are such as naturally, or after heating, give off a liquor or themselves become liquid, and thus add to the mixture sufficient moisture to give it the desired adhesive property. The most suitable substances are those which contain water of crystallization but are so little hygroscopic that they do not destroy the friability of the electrolyte mass before its introduction. Such substances are chiefly ferro-sulfate, mangano-chlorid-sulfate, acetate of lead, chromium-chlorid-sulfate, potassium-sodium-ammonium-aluminium alum, cadmium sulfate, zinc sulfate, mercury nitrate, barium chlorid, calcium sulfate (unburnt gypsum), magnesium-sulfate, magnesium-ammonium sulfate, potassium-, sodium-, ammonium-magnesium chlorid, potassium sulfate, sodium-ammonium sulfate, sodium-thiosulfate, borax, sodium sulfate (Glauber salt), sodium carbonate (soda). Many of these substances, even when slightly heated give off so much water of crystallization that they dissolve therein. Other substances can also be used which, without containing water of crystallization, become liquid on being heated such as for instance cane sugar, urea, benzoic acid and tartaric acid.

In the first case, the water of crystallization of the admixture is easily given off to the electrolyte mass. Crystallized zinc sulfate is specially suitable as such admixture. In the other case, that is to say, when the admixture is a substance which is easily melted, preferably a substance soluble in water such as cane sugar, the melting point must be below that temperature at which other ingredients of the elements are injuriously affected, that is to say, below the temperature at which solder melts, the sal-ammoniac evaporates or organic ingredients become decomposed.

What I claim is:

1. An electric battery having a filling consisting of an adhesive electrolyte mass composed of an electrolytic material which becomes active upon addition of water, and an added ingredient which though dry when added has furnished liquid to the mass in quantity sufficient to make it sticky.

2. An electric battery having a filling consisting of an adhesive electrolyte mass composed of an electrolytic material which becomes active upon addition of water, and an added ingredient containing water of crystallization, which ingredient is so slightly hygroscopic that though dry when added it has furnished liquid to the mass in quantity sufficient to make it sticky.

3. An electric battery having a filling consisting of an adhesive electrolyte mass composed of an electrolytic material which becomes active upon addition of water, and an added ingredient containing water of crystallization, which ingredient is so slightly hygroscopic that though dry when added it has upon heating furnished liquid to the mass in quantity sufficient to make it sticky.

4. An electric battery having a filling consisting of an adhesive electrolyte mass composed of an electrolytic material which becomes active upon addition of water, and an added ingredient which though dry when added has furnished, upon heating, liquid to the mass in quantity sufficient to make it sticky.

In testimony whereof, I affix my signature in presence of two witnesses.

GEORG PFLEIDERER.

Witnesses:
   HENRY HASPER,
   WOLDEMAR HAUPT.